Figure 2:
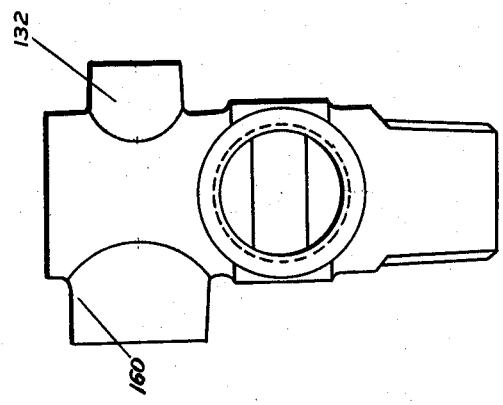

Jan. 5, 1960  J. G. BRADBURY  2,919,717
DIVERTING VALVE
Filed June 28, 1957

INVENTOR
JAMES G. BRADBURY
BY
Charles L. Lovercheck
ATTORNEY

United States Patent Office 2,919,717
Patented Jan. 5, 1960

2,919,717
DIVERTING VALVE

James G. Bradbury, Erie, Pa., assignor to Hays Manufacturing Company, Erie, Pa., a corporation of Pennsylvania Application June 28, 1957, Serial No. 668,649

2 Claims. (Cl. 137—625.25)

This invention relates to valves and, more particularly, to the type of valves having two independent seats.

Valves having two independent seats are common in the art; however, they usually have the common problem of requiring an inconvenient procedure to service them. It has usually been necessary to make the body of this type of valve in two parts or to make the stem in two parts and to make a special port in the body to provide access for removing the seat portion of the stem. In prior valves of this general type, it is frequently necessary to remove the lines connected to the valves in order to gain access to the sealing members.

In the valve disclosed herein, the sealing ring and packing can be replaced without removing the valve body from the line, thereby resulting in saving of labor and inconvenience. Prior valves of this type had considerable friction around the stem. The present invention and design requires no stuffing box and results in a uniform torque for opening and closing. The improved sealing means provided herein results in a uniform torque for sealing the valve closed and thereby results in a reduction of wear on the parts.

It is, accordingly, an object of this invention to overcome the above and other defects in present valves and, more particularly, it is an object of this invention to provide a valve which is simple in construction, economical to manufacture, and simple and efficient in operation.

Another object of the invention is to provide a diverting valve wherein the plunger thereof can be readily removed without disconnecting the valve body from any of the fluid lines.

Still another object of this invention is to provide a diverting valve having a single inlet and a plurality of outlets which can be selectively connected to the inlet wherein a plunger controls the flow from the inlet selectively to the outlets and wherein the plunger may be removed from the valve body without disconnecting the body from the pipe line.

A further object of this invention is to provide an improved diverting valve.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
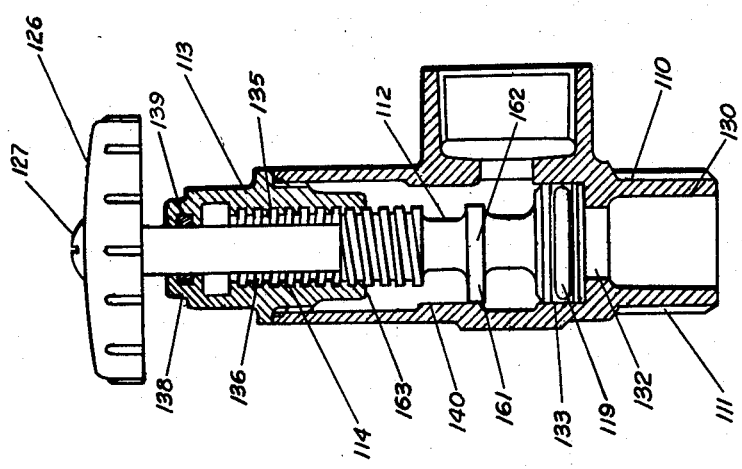

In the drawings:

Fig. 1 is a longitudinal cross sectional view of a valve according to the invention; and Fig. 2 is a partial side view of a part of the valve body shown in Fig. 1.

Now with more specific reference to the drawing, a valve 110 is shown having a hollow body 111 and a stem 112. The body 111 has a bonnet 113 which has female threads 114 which are received in complementary male threads 135 on an enlarged portion 136 of the stem 112. The upper end of the bonnet 113 is bored and has an internal slot 138 in the inner periphery of the bore which receives an O-shaped packing washer 139. The upper terminal end of the stem 112 has a handwheel 126 thereon which is held in place by a screw 127 which has a threaded end which receives a threaded bore in the stem 112 and a head which overlies the handwheel 126 in a conventional manner.

A lower portion 133 of a bore 140 terminates at its lower end in a seat and comprises a counterbore of a port 132. The O-shaped ring 119 forms sealing engagement with the seat 133 when the valve 110 is in the closed position shown. The valve 110 may be opened by rotating the stem 112 by means of the handwheel 126. This will cause the stem 112 to ride up on the threads 135 and the O-shaped ring 119 will move up into engagement with the surface 140, preventing liquid from flowing from an inlet 130 to the waste outlets 132 and 160.

It will be noted that the surface 140 extends outwardly through the hollow body 111 and is uniform in size so that when the bonnet 113 is removed, the entire bonnet 113 and stem assembly, including the O-shaped ring 119, can be drawn out for repair and inspection and replacement of the O-shaped ring 119.

A guide member 161 is integrally attached to the valve stem 112 and has an outer arcuate surface 162 which slidingly engages the inner periphery of the member 140 as the valve stem 112 is rotated. This helps to hold the lower end of the valve 110 steady at the time the valve 110 is being closed and also prevents the valve stem 112 from vibrating. It also acts as a stop to limit the upward travel of the valve stem 112 when the valve 110 is assembled by engaging a lower end 163 of the bonnet 113 when the valve 110 is fully opened. The guide member 161 extends only about half way around the outer periphery of the valve stem 112 so that fluid can freely flow past it.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body with a bore therethrough, a counterbore in said body, a first port through the walls of said body communicating with said counterbore, a second port through the walls of said body communicating with said counterbore and spaced axially from said first port, a valve stem in said counterbore, said valve stem having an enlarged lower end, sealing means on the outer periphery of said valve stem and terminating at a spaced position from the end of said enlarged lower end, said sealing means moving with said valve stem to form a seal with the inside walls of said counterbore adjacent said bore between said bore and said first port and further movable with said valve stem to a position between said first port and said second port to form a seal between said first port and said second port, a bonnet fitted into said counterbore, said valve stem extending through said bonnet, an enlarged threaded portion on said stem outwardly of said enlarged end engaging complementary threads on said bonnet, and guide means on said stem between said enlarged end and said threaded portion, said guide means engaging said bonnet when said valve stem is rotated to a position between said first port and said second port, said guide means having an outside arcuate surface engaging the inside surface of said counterbore to guide said sealing means to a sealing position between said bore and said first port, said counterbore terminating adjacent said bore in a shoulder, said enlarged end engaging said shoulder and said shoulder thereby forming a stop when said valve stem is moved to an extreme position toward said bore.

2. The valve recited in claim 1 wherein said sealing means comprises an outer peripheral groove on said valve stem and an O-shaped washer disposed in said groove.

References Cited in the file of this patent

UNITED STATES PATENTS

| | | |
|---|---|---|
| 280,448 | Cassin | July 3, 1883 |
| 901,481 | Bowell | Oct. 20, 1908 |
| 952,048 | Resek | Mar. 15, 1910 |
| 1,301,549 | Fosler | Apr. 22, 1919 |
| 2,445,505 | Ashton | July 20, 1948 |
| 2,789,697 | Kryzer | Apr. 23, 1957 |
| 2,796,887 | Stern | June 25, 1957 |